(12) United States Patent
Bradbrook et al.

(10) Patent No.: US 11,649,730 B2
(45) Date of Patent: May 16, 2023

(54) HEAT EXCHANGER

(71) Applicant: ROLLS-ROYCE plc, London (GB)

(72) Inventors: Stephen J Bradbrook, Bristol (GB); Martin N Goodhand, Bristol (GB); Paul M Hield, Bristol (GB); Andrew Parsley, Bristol (GB); Natalie C Wong, Bristol (GB); Robert J Corin, Bristol (GB); Thomas S Binnington, Bristol (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/496,193

(22) Filed: Oct. 7, 2021

(65) Prior Publication Data

US 2022/0112813 A1 Apr. 14, 2022

(30) Foreign Application Priority Data

Oct. 9, 2020 (GB) ..................................... 2016008

(51) Int. Cl.
*F02C 7/12* (2006.01)
*F01D 5/18* (2006.01)
(Continued)

(52) U.S. Cl.
CPC .............. *F01D 5/18* (2013.01); *F01D 5/021* (2013.01); *F01D 9/041* (2013.01); *F02C 7/12* (2013.01);
(Continued)

(58) Field of Classification Search
CPC . F01D 5/18; F01D 5/021; F01D 9/041; F02C 7/12; F28D 7/1615; F05D 2220/32; F05D 2220/36; F05D 2021/0026
See application file for complete search history.

(56) References Cited

U.S. PATENT DOCUMENTS

| 2,474,258 A | 6/1949 | Kroon |
| 6,990,797 B2 * | 1/2006 | Venkataramani ....... F02C 7/047 60/39.093 |

(Continued)

FOREIGN PATENT DOCUMENTS

| EP | 1916399 A2 | 4/2008 |
| EP | 2085600 A2 | 8/2009 |

(Continued)

OTHER PUBLICATIONS

Apr. 8, 2021 Office Action and Search Report issued in British Patent Application No. GB2016008.1.

(Continued)

*Primary Examiner* — Igor Kershteyn
*Assistant Examiner* — Theodore C Ribadeneyra
(74) *Attorney, Agent, or Firm* — Oliff PLC

(57) ABSTRACT

A turbofan gas turbine engine includes, in axial flow sequence, a heat exchanger module, a fan assembly, a compressor module, a turbine module, and an exhaust module. The fan assembly includes fan blades defining a fan diameter. The heat exchanger module is in communication with the fan assembly by an inlet duct, and the heat exchanger module further includes radially-extending hollow vanes arranged in a circumferential array, with a channel extending axially between hollow vanes. Each hollow vane accommodates at least one heat transfer element to transfer heat from a first fluid contained within the or each heat transfer element to a corresponding vane airflow passing through the hollow vane and over a surface of the or each heat transfer element. Each hollow vane further includes a flow modulator configured to regulate airflow in proportion to total airflow entering the heat exchanger module in response to a user requirement.

14 Claims, 10 Drawing Sheets

(51) Int. Cl.
*F01D 5/02* (2006.01)
*F28D 7/16* (2006.01)
*F01D 9/04* (2006.01)
*F28D 21/00* (2006.01)

(52) U.S. Cl.
CPC ........ *F28D 7/1615* (2013.01); *F05D 2220/32* (2013.01); *F05D 2220/36* (2013.01); *F28D 2021/0026* (2013.01)

(56) References Cited

U.S. PATENT DOCUMENTS

| | | | | |
|---|---|---|---|---|
| 7,377,098 | B2* | 5/2008 | Walker | F01D 25/18 60/39.83 |
| 7,861,512 | B2* | 1/2011 | Olver | F02K 3/04 60/39.08 |
| 7,950,899 | B2* | 5/2011 | Euvino, Jr. | F02C 7/04 415/220 |
| 8,247,746 | B2* | 8/2012 | Alexander | H05B 3/30 439/651 |
| 8,257,030 | B2* | 9/2012 | Lyders | F01D 9/041 415/142 |
| 8,312,726 | B2* | 11/2012 | Wong | F01D 25/162 60/770 |
| 9,249,730 | B2* | 2/2016 | Bourassa | F01D 5/189 |
| 10,066,495 | B2 | 9/2018 | Roberts et al. | |
| 11,156,114 | B2* | 10/2021 | Chalaud | F01D 9/041 |
| 11,286,798 | B2* | 3/2022 | Whittle | F01D 5/282 |
| 2004/0035562 | A1* | 2/2004 | Nishijima | F28F 13/06 165/177 |
| 2005/0008482 | A1 | 1/2005 | Allford et al. | |
| 2005/0076504 | A1* | 4/2005 | A. Morrison | F01D 9/044 29/889.7 |
| 2006/0280600 | A1* | 12/2006 | Euvino, Jr. | F02C 7/047 415/175 |
| 2009/0241509 | A1 | 10/2009 | Hogate | |
| 2009/0260341 | A1* | 10/2009 | Hogate | F01D 25/02 60/39.093 |
| 2011/0206522 | A1* | 8/2011 | Alvanos | F01D 5/3007 428/68 |
| 2012/0243970 | A1* | 9/2012 | Hellgren | F01D 5/187 415/178 |
| 2015/0023776 | A1* | 1/2015 | Ribarov | F01D 9/065 415/1 |
| 2015/0354380 | A1 | 12/2015 | Roberts et al. | |
| 2017/0003080 | A1 | 1/2017 | Whaites et al. | |
| 2017/0058676 | A1* | 3/2017 | Rice | F02K 3/06 |
| 2017/0321564 | A1* | 11/2017 | Bunker | F01D 5/187 |
| 2019/0145264 | A1* | 5/2019 | Jonnalagadda | F01D 9/041 415/115 |

FOREIGN PATENT DOCUMENTS

| | | |
|---|---|---|
| EP | 3023724 A1 | 5/2016 |
| GB | 2238080 A | 5/1991 |
| GB | 2 292 422 A | 2/1996 |

OTHER PUBLICATIONS

Mar. 7, 2022 Extended European Search Report issued in Patent Application No. 21200620.9.

* cited by examiner

VIEW ON C-C'

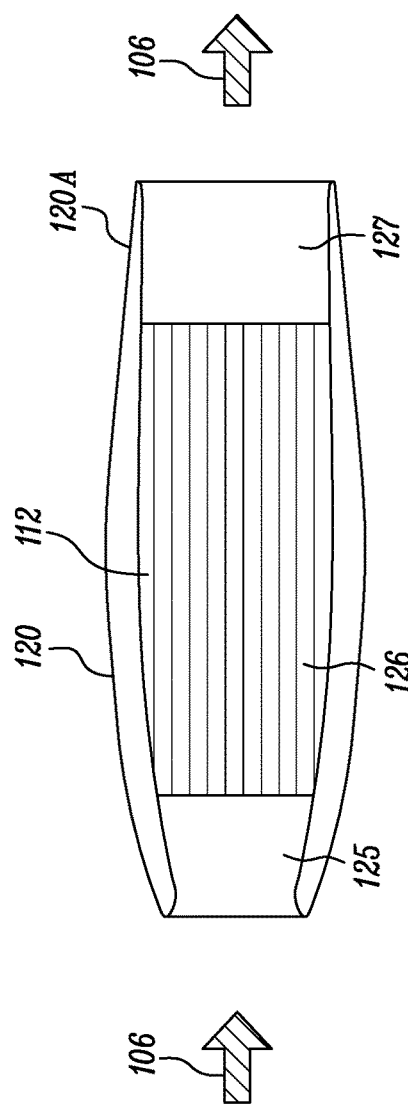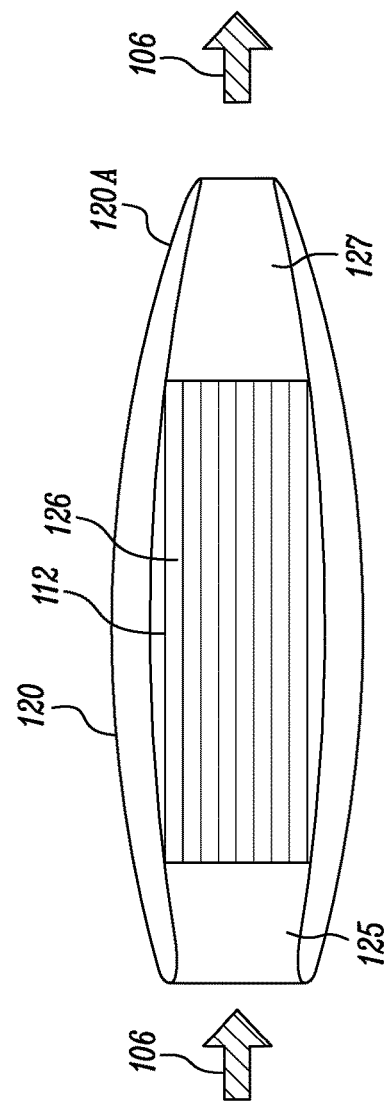

HEAT EXCHANGER

This disclosure claims the benefit of UK Patent Application No. GB 2016008.1, filed on 9 Oct. 2020, which is hereby incorporated herein in its entirety.

FIELD OF THE DISCLOSURE

The present disclosure relates to a circumferential vane array accommodating a heat exchanger and particularly to a circumferential vane array accommodating a heat exchanger, for use with a turbofan gas turbine engine.

BACKGROUND TO THE DISCLOSURE

A conventional turbofan gas turbine engine uses heat exchangers to cool a variety of fluids including inter alia air, fuel and oil. Typically, such heat exchangers use bypass air or an air offtake from the compressor as the cooling medium. The heat exchanger itself may be positioned in the bypass duct or externally to the engine with the corresponding ducting.

The use of bypass air or a compressor offtake stream as the cooling medium in a heat exchanger will adversely affect the performance of the engine, for example by reducing specific thrust or increasing specific fuel consumption. Alternatively, or additionally, such offtakes can adversely affect engine performance, for example by reducing surge margin.

In a further alternative conventional arrangement, an air flow to provide the cooling medium in a heat exchanger may be drawn separately from the air flow through the gas turbine engine. For example, in an airframe application the air flow providing the cooling medium may be drawn from an air intake or duct separate from the engine.

As used herein, a range "from value X to value Y" or "between value X and value Y", or the likes, denotes an inclusive range; including the bounding values of X and Y. As used herein, the term "axial plane" denotes a plane extending along the length of an engine, parallel to and containing an axial centreline of the engine, and the term "radial plane" denotes a plane extending perpendicular to the axial centreline of the engine, so including all radial lines at the axial position of the radial plane. Axial planes may also be referred to as longitudinal planes, as they extend along the length of the engine. A radial distance or an axial distance is therefore a distance in a radial or axial plane, respectively.

Statements of Disclosure

According to a first aspect of the present disclosure there is provided a turbofan gas turbine engine comprising, in axial flow sequence, a heat exchanger module, a fan assembly, a compressor module, a turbine module, and an exhaust module, the fan assembly comprising a plurality of fan blades defining a fan diameter (D), the heat exchanger module being in fluid communication with the fan assembly by an inlet duct, the heat exchanger module further comprising a plurality of radially-extending hollow vanes arranged in a circumferential array, with a channel extending axially between each pair of adjacent hollow vanes, each of the hollow vanes accommodating at least one heat transfer element for the transfer of heat from a first fluid contained within the or each heat transfer element to a corresponding vane airflow passing through the hollow vane and over a surface of the or each heat transfer element, each of the hollow vanes further comprising a flow modulator, the flow modulator being configured to actively regulate the vane airflow as a proportion of a total airflow entering the heat exchanger module in response to a user requirement.

The active regulation of the vane airflow as a proportion of the total airflow entering the heat exchanger module enables a user to determine the proportion of the intake air flow that passes through the hollow vanes and therefore the proportion of the intake air that passes over the heat transfer elements.

Since the vane airflow through the hollow vanes incurs an aerodynamic penalty over the channel airflow that passes between adjacent vanes, by regulating the vane airflow to only that required to maintain a required level of heat energy rejection to the vane airflow, a user can maximise the aerodynamic efficiency of the turbofan engine.

in one example configuration a user may require the vane air flow to be, for example, one third ($\frac{1}{3}$) of the channel air flow in order for the vane air flows to provide for efficient transfer of heat energy from the first fluid through the heat transfer elements. In alternative configurations, the proportion of the total air flow entering the heat exchange module that makes up the vane air flow may be greater or less than one third ($\frac{1}{3}$).

Optionally, the airflow entering the heat exchange module is divided between the set of vane airflows through each hollow vane, each vane airflow having a vane mass flow rate $Flow_{Vane}$, and a set of channel airflows through each channel, each channel air flow having a channel mass flow rate $Flow_{Chan}$, and the flow modulator is configured to actively regulate a ratio between a sum of the vane mass flow rates $Flow_{VaneTot}$ and a sum of the channel mass flow rates $Flow_{ChanTot}$.

As outlined above, the heat energy rejected by the heat transfer elements is transferred to the vane air flows passing through the hollow vanes and over the heat transfer elements. Specifically, the vane mass flow rate is a controlling factor in the quantity of heat energy transferred to the vane air flows. Consequently, the ability for a user to regulate the proportion of the intake flow that passes through the hollow vanes thereby enables the user to control the quantity of heat energy transferred to the vane air flows.

Optionally, each hollow vane comprises, in axial flow sequence, an inlet portion, the at least one heat transfer element, and an exhaust portion, the inlet portion comprising a flow modulator, the flow modulator being configured to restrict the vane airflow in response to the user requirement.

In one arrangement of the present disclosure, the flow modulator comprises one or more first vanes positioned at the inlet portion. The first vanes may be positioned upstream of an inlet aperture to the hollow vane. Alternatively, the flow modulator may comprise one or more first vanes that form the inlet portion of the hollow vane. In a further alternative arrangement, the first vanes may be positioned at the inlet aperture to the hollow vane. The flow modulator in the form of the first vanes can be actively regulated by a user to limit the vane air flow entering the hollow vane and thus to limit the vane mass flow rate.

Optionally, each hollow vane comprises, in axial flow sequence, an inlet portion, the at least one heat transfer element, and an exhaust portion, the exhaust portion comprising a flow modulator, the flow modulator being configured to restrict the vane airflow in response to the user requirement.

In another arrangement of the present disclosure, the flow modulator comprises one or more second vanes positioned at the exhaust portion. Alternatively, the exhaust portion of the hollow vane may be formed by the flow modulator in the form of the second vanes.

In yet another arrangement, the exhaust portion of the hollow vane may comprise the flow modulator. For example, the flow modulator forming the exhaust portion may comprise a shape memory material that is configured to restrict the vane airflow exhausted from the hollow vane in response to the user requirement.

In each of these arrangements, the flow modulator in the form of the second vanes may be actively regulated by a user to restrict the vane air flow exhausted from the hollow vane and in this way to limit the vane mass flow rate.

Optionally, the fan diameter D is within the range of 0.3 m to 2.0 m, preferably within the range 0.4 m to 1.5 m, and more preferably in the range of 0.7 m to 1.0 m.

In one embodiment of the disclosure, the fan diameter is 0.9 m.

Consequently, for the same heat energy loading rejected to the air flow through the heat exchanger, the loss in propulsive efficiency of the turbofan engine is proportionately smaller for a large diameter (for example, approximately 1.5 to 2.0 m in diameter) turbofan engine than for a small diameter turbofan engine.

The fan tip radius, measured between a centreline of the engine and an outermost tip of each fan blade at its leading edge, may be in the range from 95 cm to 200 cm, for example in the range from 110 cm to 150 cm, or alternatively in the range from 155 cm to 200 cm. The fan tip radius may be greater than any of: 110 cm, 115 cm, 120 cm, 125 cm, 130 cm, 135 cm, 140 cm, 145 cm, 150 cm, 155 cm, 160 cm, 165 cm, 170 cm, 175 cm, 180 cm, 185 cm, 190 cm or 195 cm. The fan tip radius may be around 110 cm, 115 cm, 120 cm, 125 cm, 130 cm, 135 cm, 140 cm, 145 cm, 150 cm, 155 cm, 160 cm, 165 cm, 170 cm, 175 cm, 180 cm, 185 cm, 190 cm or 195 cm. The fan tip radius may be greater than 160 cm.

The fan tip radius may be in the range from 95 cm to 150 cm, optionally in the range from 110 cm to 150 cm, optionally in the range of from 110 cm to 145 cm, and further optionally in the range from 120 cm to 140 cm.

The fan tip radius may be in the range from 155 cm to 200 cm, optionally in the range from 160 cm to 200 cm, and further optionally in the range from 165 cm to 190 cm.

Optionally, the heat exchanger module has a flow area $A_{HEX}$ and the fan module has a flow area $A_{FAN}$, and a ratio of $A_{FAN}$ to $A_{HEX}$ being in the range of 0.3 to 0.8.

The flow area is to be understood to mean a cross-sectional area of the air flow taken perpendicularly to a central axis of the flow in the flow direction. In other words, for the heat exchanger module the flow area $A_{HEX}$ corresponds to the cross-sectional area of the heat exchanger module through which the flow passes. Likewise, for the fan assembly the flow area $A_{FAN}$ corresponds to the cross-sectional area of the fan assembly through which the flow passes.

In one arrangement of the present disclosure, the flow area of the heat exchanger module has an annular profile and extends over only a radially outward circumferential portion of the flow area of the fan assembly. In other words, the air flow entering a radially proximal portion of the flow area of the fan assembly does not pass through the heat exchanger assembly and simply enters the fan assembly. In one arrangement, the radially outward circumferential portion of the flow area of the fan assembly amounts to 60% of the flow area of the fan assembly.

In another arrangement of the disclosure, the flow area of the heat exchanger module extends completely over the flow area of the fan assembly.

Optionally, the heat exchanger module has a fluid path diameter E, wherein the fluid path diameter E is greater than the fan diameter D.

In one embodiment, the heat exchanger module has a fluid path diameter E that is greater than the fan diameter D. In this embodiment, the inlet duct that connects the heat exchanger module to the fan assembly has a diameter than converges from an exit from the heat exchanger module to an entrance to the fan assembly.

Optionally, the turbofan gas turbine engine further comprises an outer housing, the outer housing enclosing the sequential arrangement of heat exchanger module, fan assembly, compressor module, and turbine module, an annular bypass duct being defined between the outer housing and the sequential arrangement of modules, a bypass ratio being defined as a ratio of a mass air flow rate through the bypass duct to a mass air flow rate through the sequential arrangement of modules, and wherein the bypass ratio is less than 2.0.

A turbofan engine having a bypass ratio (BPR) of less than approximately 2.0 will have a generally smaller bypass duct (the annular duct surrounding the core gas turbine engine) than a turbofan engine having a BPR greater than approximately 2.0. For a turbofan engine with a BPR greater than, say, 2.0, the correspondingly larger bypass duct volume provides more scope for positioning a heat exchanger within the bypass duct than would be the case for a low BPR turbofan engine.

Optionally, the fan assembly has two or more fan stages, at least one of the fan stages comprising a plurality of fan blades defining the fan diameter D.

In one arrangement, the fan assembly has two fan stages with both fan stages comprising a plurality of fan blades defining the same fan diameter. Alternatively, each of the fan stages may have different fan diameters.

Optionally, in use, an airflow entering the heat exchanger module with a mean velocity of 0.4M, is divided between the set of vane airflows having a mean velocity of 0.2M, and the set of channel airflows having a mean velocity of 0.6M.

In one arrangement of the present disclosure, the inlet and exhaust portions of the hollow vane may act as a diffuser to slow the air flow entering the hollow vane. In other words, the vane mass air flow is reduced from the mass air flow of the air flow entering the heat exchanger module. In this arrangement, the channel air flow through the channels between circumferentially adjacent pairs of hollow vanes is increased to maintain continuity of flow.

According to another aspect of the present disclosure there is provided a method of operating an aircraft comprising the gas turbine engine according to the first aspect, the method comprising taking off from a runway, wherein the maximum rotational speed of the turbine during take-off is in the range of from 8500 rpm to 12500 rpm.

The maximum take-off rotational fan speed may be in a range between 8500 rpm to 12500 rpm. Optionally, for example for an engine with a fan tip radius in the range from 25 cm to 40 cm, the maximum take-off rotational fan speed may be in a range between 9000 rpm to 11000 rpm. Optionally, for example for an engine with a fan tip radius in the range from 35 cm to 50 cm, the maximum take-off rotational fan speed may be in a range between 8500 rpm to 10500 rpm.

According to another aspect of the present disclosure there is provided a method of operating a turbofan gas turbine engine, the gas turbine engine comprising, in axial flow sequence, a heat exchanger module, an inlet duct, a fan assembly, a compressor module, a turbine module, and an exhaust module, and wherein the method comprises the steps of:

(i) providing the fan assembly, the compressor module, and the turbine module;
(ii) positioning the heat exchanger module in fluid communication with the fan assembly by the inlet duct;
(iii) providing the heat exchanger module with a plurality of radially-extending hollow vanes arranged in a circumferential array, with a channel extending axially through the heat exchanger module between each pair of adjacent hollow vanes, such that an airflow entering the heat exchange module is divided between a set of vane airflows through each of the hollow vanes, each vane airflow having a vane mass flow rate $Flow_{Vane}$, and a set of channel airflows $Flw_{Chan}$ through each of the channels, each channel air flow having a channel mass flow rate $Flow_{Chan}$;
(iv) providing each of the hollow vanes with, at least one heat transfer element, and a flow modulator;
(v) operating the gas turbine engine including active control of the flow modulator to regulate a sum of the vane mass flow rates $Flow_{VaneTot}$ as a proportion of a total air mass flow entering the heat exchanger module in response to a user requirement.

The active regulation of the vane airflow as a proportion of the total airflow entering the heat exchanger module enables a user to determine the proportion of the intake air flow that passes through the hollow vanes and therefore the proportion of the intake air that passes over the heat transfer elements.

Since the vane airflow through the hollow vanes incurs an aerodynamic penalty over the channel airflow that passes between adjacent vanes, by regulating the vane airflow to only that required to maintain a required level of heat energy rejection to the vane airflow, a user can maximise the aerodynamic efficiency of the turbofan engine.

in one example configuration a user may require the vane air flow to be, for example, one third (⅓) of the channel air flow in order for the vane air flows to provide for efficient transfer of heat energy from the first fluid through the heat transfer elements. In alternative configurations, the proportion of the total air flow entering the heat exchange module that makes up the vane air flow may be greater or less than one third (⅓).

According to another aspect of the present disclosure there is provided a turbofan gas turbine engine comprising, in axial flow sequence, a heat exchanger module, a fan assembly, a compressor module, a turbine module, and an exhaust module, the fan assembly comprising a plurality of fan blades defining a fan diameter (D), the heat exchanger module being in fluid communication with the fan assembly by an inlet duct, the heat exchanger module comprising a plurality of radially-extending hollow vanes arranged in a circumferential array with a channel extending axially between each pair of adjacent hollow vanes, an airflow entering the heat exchanger module being divided between a set of vane airflows through each hollow vane, each vane airflow having a vane mass flow rate $Flow_{vane}$, and a set of channel airflows through each channel, each channel air flow having a channel mass flow rate $Flow_{Chan}$, at least one of the hollow vanes accommodating at least one heat transfer element for the transfer of heat from a first fluid contained within the or each heat transfer element to the or each corresponding vane airflow passing over a surface of the or each heat transfer element;

and, in use, a Vane Airflow Ratio parameter $V_{AR}$ is defined as:

$$VAR = \frac{Flow_{VaneTot}}{Flow_{ChanTot}}$$

where:
$Flow_{VaneTot}$=total mass flow rate of the vane mass flow rates, $Flow_{Vane}$; and
$Flow_{ChanTot}$=total mass flow rate of the channel mass flow rates, $Flow_{Chan}$;
and the $V_{AR}$ parameter is in the range of 0.05 to 3.0.

The VAR parameter provides a useful measure of the proportion of the total mass air flow that is entering the turbofan engine, and thus is ingested by the fan assembly for combustion and power generation, that passes through the hollow vanes of the heat exchanger module and is thus available for heat energy rejection purposes.

The parameter of mass air flow rate (typically expressed in kg/s) is well known to the skilled person, as is its measurement, and neither will be discussed further herein.

In an arrangement according to the present disclosure, between 5% and 75% of the mass air flow entering the fan assembly will have passed through the hollow vanes and hence over a surface of the heat transfer elements. This range has been determined to be sufficient to provide the capability to reject operationally waste heat energy to the incoming air flow.

Optionally, the $V_{AR}$ parameter is in the range of 0.43 to 1.0.

In an alternative arrangement of the present disclosure, the proportion of the mass air flow entering the fan assembly that has passed through the vanes and thus over a surface of the heat transfer elements is between 30% and 50%.

Optionally, the or each heat transfer element extends axially within the corresponding hollow vane.

By extending axially along an interior volume of the hollow vane, the heat transfer element can efficiently transfer heat energy to the incoming vane air flow without the need to force the incoming vane air flow to change direction. This makes the heat exchanger module of the present disclosure more aerodynamically efficient and thus more versatile and desirable for a user.

In alternative arrangements in which multiple heat transfer elements are positioned within a hollow vane, these heat transfer elements may be positioned side-by-side (i.e. circumferentially adjacent) or end-to end (i.e. axially adjacent). However, in each of these alternative arrangements, the individual heat transfer elements extend axially within the corresponding hollow vane.

Optionally, the heat exchanger module has an annular flow area defined by an outer diameter and an inner diameter, each of the hollow vanes extends radially inwardly from the outer diameter and partially across the annular flow area.

In an arrangement in which the required heat energy rejection capability can be met by a heat exchanger module having a flow area that is less than the fan face area, then the annular depth of the heat exchanger module may be reduced to provide a radially proximal annular region in which the incoming air flow bypasses the vanes and passes directly into the fan assembly.

In this arrangement, the aerodynamic losses resulting from the incoming air flow passing through and between the hollow vanes can be reduced. This makes improves the efficiency of the gas turbine engine having this alternative configuration.

According to another aspect of the present disclosure there is provided a method of operating a turbofan gas turbine engine, the gas turbine engine comprising, in axial flow sequence, a heat exchanger module, an inlet duct, a fan assembly, a compressor module, and a turbine module, and an exhaust module, and wherein the method comprises the steps of:

(i) providing the fan assembly, the compressor module, and the turbine module, and the exhaust module;

(ii) positioning the heat exchanger module in fluid communication with the fan assembly by the inlet duct;

(iii) providing the heat exchanger module with a plurality of radially-extending hollow vanes arranged in a circumferential array with a channel extending axially between each pair of adjacent hollow vanes, at least one of the hollow vanes accommodating at least one heat transfer element for the transfer of heat energy from a first fluid contained within the or each heat transfer element to a corresponding vane airflow through the or each hollow vane and over a surface of the or each heat transfer element; and (iv) operating the gas turbine engine such that an airflow entering the heat exchange module is divided between the set of vane airflows through each hollow vane, each vane airflow having a vane mass flow rate $Flow_{Vane}$, and a set of channel airflows through each channel, each channel airflow having a channel mass flow rate $Flow_{Chan}$, with a Vane Airflow Ratio parameter $V_{AR}$ being defined as:

$$VAR = \frac{Flow_{VaneTot}}{Flow_{ChanTot}}$$

where:

$Flow_{VaneTot}$=total mass flow rate of the vane airflows, $Flow_{vane}$; and $Flow_{ChanTot}$=total mass flow rate of the channel airflows, $Flow_{Chan}$;

and the $V_{AR}$ parameter is in the range of 0.05 to 3.0.

In an arrangement according to the present disclosure, between 5% and 75% of the mass air flow entering the fan assembly will have passed through the hollow vanes and hence over a surface of the heat transfer elements. This range has been determined to be sufficient to provide the capability to reject operationally waste heat energy to the incoming air flow.

Optionally, in step (iv) the engine is operated at a maximum dry thrust setting, and the $V_{AR}$ parameter is in the range of 0.43 to 1.0.

In an alternative arrangement of the present disclosure, the proportion of the mass air flow entering the fan assembly that has passed through the vanes and thus over a surface of the heat transfer elements is between 30% and 50%.

Optionally, in step (iii) the or each heat transfer element extends axially within the corresponding hollow vane.

By extending axially along an interior volume of the hollow vane, the heat transfer element can efficiently transfer heat energy to the incoming vane air flow without the need to force the incoming vane air flow to change direction. This makes the heat exchanger module of the present disclosure more aerodynamically efficient and thus more versatile and desirable for a user.

In alternative arrangements in which multiple heat transfer elements are positioned within a hollow vane, these heat transfer elements may be positioned side-by-side (i.e. circumferentially adjacent) or end-to end (i.e. axially adjacent). However, in each of these alternative arrangements, the individual heat transfer elements extend axially within the corresponding hollow vane.

According to another aspect of the present disclosure there is provided a turbofan gas turbine engine comprising, in axial flow sequence, a heat exchanger module, a fan assembly, a compressor module, a turbine module, and an exhaust module, the fan assembly comprising a plurality of fan blades defining a fan diameter (D), the heat exchanger module being in fluid communication with the fan assembly by an inlet duct, the heat exchanger module comprising a plurality of radially-extending hollow vanes arranged in a circumferential array, with a channel extending axially between each pair of adjacent hollow vanes, an airflow entering the heat exchange module being divided between a set of vane airflows through each hollow vane, each vane airflow having a vane mass flow rate $Flow_{Vane}$, and a set of channel airflows through each channel, each channel air flow having a channel mass flow rate $Flow_{Chan}$, each of the hollow vanes accommodating at least one heat transfer element for the transfer of heat from a first fluid contained within the or each heat transfer element to the corresponding vane airflow passing over a surface of the or each heat transfer element;

wherein each hollow vane comprises, in axial flow sequence, an inlet portion, a heat transfer portion, and an exhaust portion, the inlet portion comprising a diffuser element, and the heat transfer portion comprising at least one heat transfer element, and, the diffuser element being configured to cause the vane mass flow rate $Flow_{Vane}$ to be lower than the channel mass flow rate $Flow_{Chan}$ by a user-defined margin.

The inclusion of a diffuser at the inlet to the hollow vane provides a smooth transition between the air flow upstream of the heat exchanger module and the air flow passing into and through the hollow vane. The diffuser slows the velocity of the air flow as the air flow enters the hollow vane and minimises the aerodynamic losses during this process.

Since it is the vane air flow passing over a surface of the heat transfer elements that enables the rejection of the heat energy to the vane air flow, a reduction in the velocity of the vane air flow improves the efficiency of the heat transfer process. This makes the heat exchanger module of the present disclosure more efficient at rejecting heat energy to the vane air flows.

Slowing the vane air flow passing through the hollow vane, relative to the channel air flow passing through the channel between adjacent vanes, reduces the risk of damage that may be caused to the heat transfer elements by foreign objects entering the hollow vane. This improves the reliability of the turbofan engine.

For example, in order for the vane air flows to provide for efficient transfer of heat energy from the first fluid through the heat transfer elements a user may require the vane mass flow rate $Flow_{vane}$ to be one third (⅓) of the channel mass flow rate $Flow_{Chan}$. In alternative arrangements, this proportion may differ.

Optionally, the diffuser element comprises an axially extending first duct, with an axial cross-section of the first duct having a divergent profile in the axial flow direction.

In one arrangement of the present disclosure, the diffuser element takes the form of a divergent passage extending downstream in the flow direction from the inlet aperture of the hollow vane. In this arrangement, the divergent profile is linear; in other words, in the diffuser element, the increase in the interior width of the hollow vane (in the circumferential direction) is directly proportional to the axial distance along the diffuser element part of the hollow vane. In alternative arrangements, this divergent profile may be non-linear and may follow, for example, a parabolic or elliptical profile.

Optionally, the exhaust portion comprises an axially extending second duct, with an axial cross-section of the second duct having a convergent profile in the axial flow direction.

In another arrangement of the present disclosure, the hollow vane is provided with a convergent profile at its exhaust portion. This feature has the effect of speeding up the vane air flow passing exiting the hollow vane and thus enhances the effectiveness of the diffuser positioned at the inlet to the hollow vane. For example, by speeding up the air flow exiting the hollow vane it becomes easier to blend this vane air flow with the faster moving channel air flows passing on either side of the vane air flow.

In the present embodiment, the convergent profile in the exhaust portion of the hollow vane has a linear profile. However, in other arrangements the convergent profile may also be non-linear; for example, logarithmic or elliptical.

Optionally, the or each heat transfer element extends axially within the corresponding vane.

By extending axially along an interior volume of the hollow vane, the heat transfer element can efficiently transfer heat energy to the incoming vane air flow without the need to force the incoming vane air flow to change direction. This makes the heat exchanger module of the present disclosure more aerodynamically efficient and thus more versatile and desirable for a user.

In alternative arrangements in which multiple heat transfer elements are positioned within a hollow vane, these heat transfer elements may be positioned side-by-side (i.e. circumferentially adjacent) or end-to end (i.e. axially adjacent). However, in each of these alternative arrangements, the individual heat transfer elements extend axially within the corresponding hollow vane.

Optionally, one or more first vanes are positioned upstream of the inlet portion such that air flow entering the hollow vane passes across the or each first vane.

The use of one or more vanes upstream of the inlet to the hollow vane can deflect foreign objects carried in the inlet air flow and that might otherwise enter the hollow vane and cause mechanical damage to any heat transfer elements positioned inside the hollow vane. By blocking a direct line-of-sight into an inlet aperture of the hollow vane, the upstream vane(s) can prevent foreign objects from entering the hollow vane. This in turn can improve the robustness of the heat exchanger module and consequently also improve the reliability of the heat exchanger module.

Optionally, one or more second vanes are positioned downstream of the exhaust portion such that air flow exhausted from the hollow vane passes across the or each second vane.

By positioning one or more vanes at the exhaust outlet from the hollow vane it may be possible to further slow the vane air flow through the hollow vane, which improves the aerodynamic efficiency of the hollow vane.

As outlined above, the vane air flow exhausts the hollow vane at a lower velocity than that of the channel air flow passing between vanes. The appropriate positioning and orientation of vanes downstream of the exhaust portion of the hollow vane can be used to blend the lower velocity vane air flow into the higher velocity channel air flow prior to the ingestion of the mixed flow by the fan assembly. Such blending may improve the aerodynamic efficiency of the fan assembly.

According to another aspect of the present disclosure there is provided a method of operating a turbofan gas turbine engine, the gas turbine engine comprising, in axial flow sequence, a heat exchanger module, an inlet duct, a fan assembly, a compressor module, a turbine module, and an exhaust module, and wherein the method comprises the steps of:

(i) providing the fan assembly, the compressor module, the turbine module, and the exhaust module;

(ii) positioning the heat exchanger module in fluid communication with the fan assembly by the inlet duct;

(iii) providing the heat exchanger module with a plurality of radially-extending hollow vanes arranged in a circumferential array with a channel extending axially through the heat exchanger module between each pair of adjacent hollow vanes, such that an airflow entering the heat exchange module is divided between a set of vane airflows through each of the hollow vanes, each vane airflow having a vane mass flow rate $Flow_{Vane}$, and a set of channel airflows through each of the channels, each channel air flow having a channel mass flow rate $Flow_{Chan}$;

(iv) providing each of the hollow vanes with, in axial flow sequence, an inlet portion, a heat transfer portion, and an exhaust portion, the inlet portion comprising a diffuser element, and the heat transfer portion comprising at least one heat transfer element for the transfer of heat energy from a first fluid contained within the or each heat transfer element to a corresponding vane airflow through the or each hollow vane and over a surface of the or each heat transfer element; and (v) sizing the diffuser elements such that when operating the gas turbine engine, a total vane mass flow rate $Flow_{VaneTot}$ is lower than a total channel mass flow rate $Flow_{ChanTot}$ by a user-defined margin.

The inclusion of a diffuser at the inlet to the hollow vane provides a smooth transition between the air flow upstream of the heat exchanger module and the air flow passing into and through the hollow vane. The diffuser slows the velocity of the air flow as the air flow enters the hollow vane and minimises the aerodynamic losses during this process.

Since it is the vane air flow passing over a surface of the heat transfer elements that enables the rejection of the heat energy to the vane air flow, a reduction in the velocity of the vane air flow improves the efficiency of the heat transfer process. This makes the heat exchanger module of the present disclosure more efficient at rejecting heat energy to the vane air flows.

Slowing the vane air flow passing through the hollow vane, relative to the channel air flow passing through the channel between adjacent vanes, reduces the risk of damage that may be caused to the heat transfer elements by foreign objects entering the hollow vane. This improves the reliability of the turbofan engine.

For example, in order for the vane air flows to provide for efficient transfer of heat energy from the first fluid through the heat transfer elements a user may require the vane mass flow rate $Flow_{Vane}$ to be one third (⅓) of the channel mass flow rate $Flow_{Chan}$. In alternative arrangements, this proportion may differ.

According to another aspect of the present disclosure there is provided a turbofan gas turbine engine comprising, in axial flow sequence, a heat exchanger module, a fan assembly, a compressor module, a turbine module, and an exhaust module, the fan assembly comprising a plurality of fan blades defining a fan diameter (D), the heat exchanger module being in fluid communication with the fan assembly by an inlet duct, the heat exchanger module comprising a plurality of heat transfer elements for transfer of heat from a first fluid contained within the heat transfer elements to an airflow passing over a surface of the heat transfer elements prior to entry of the airflow into an inlet to the fan assembly, wherein each heat transfer element may be individually and independently fluidly isolated from the remaining heat transfer elements.

In one arrangement of the present disclosure, the first fluid is an oil that is used to provide cooling to other parts of the turbofan engine. The oil is circulated through the heat transfer elements while the air flow passing over the heat transfer elements enables the rejection of heat energy from the oil to the air flow.

Any physical damage to the heat transfer element may result in leakage of the oil from the heat transfer element. Such physical damage might be caused to the heat transfer element by a foreign object carried through on the vane air flow.

Leakage of oil resulting from damage is undesirable since the oil is required for the heat rejection process. If more than a pre-determined quantity of oil is lost from the oil system, the turbofan engine may become inoperative.

An oil leakage arising from damage to a heat transfer element may result in oil entering, for example, the secondary air system cavities. This could pose a serious fire risk to the turbofan engine, which is undesirable. The secondary air system includes those air flows that are required for the safe operation of the turbofan engine such as inter alia, the turbine cooling air, bearing and rim sealing air, bearing thrust control, active tip clearance control, and handling bleeds.

Additionally, the downstream air from the gas turbine engine, for example a compressor bleed, may be used for ventilation purposes and the presence of oil in such an air stream is undesirable.

The arrangement of the present disclosure enables a damaged heat transfer element to be isolated from the remaining heat transfer elements. This will prevent further oil loss from the damaged element and enable continued operation of the gas turbine engine albeit at perhaps slightly reduced heat energy rejection capability.

Optionally, each heat transfer element comprises an inlet and an outlet, and both the inlet and the outlet are selectably closable to fluidly isolate the heat transfer element.

In one arrangement of the present disclosure, an actuatable valve is positioned on each of the inlet to and outlet from each heat transfer element. In the event of an oil leak from the heat transfer element the valves on each of the inlet to and outlet from the heat transfer element can be closed. This fluidly isolates the damaged heat transfer element from the remainder of the heat transfer element.

In another arrangement, an actuatable valve may be provided on only one of the inlet to and outlet from the heat transfer element. In this arrangement, a one-way valve may be provided on the other of the inlet to and outlet from the heat transfer element. In this way, if a leak is present in the heat transfer element then the actuatable valve may be closed to fluidly isolate the heat transfer element and prevent further loss of oil from the system.

Optionally, the heat exchanger module further comprises a flow sensor configured to detect a flow rate of the first fluid through the heat transfer elements, and the heat exchanger module is configured to isolate a heat transfer element in the event that the detected flow rate is outside of a predetermined acceptable flow rate range.

The monitoring of the first fluid flow rate will enable a user to determine whether there is any leakage of the first fluid. In response to the leak determination, the respective heat transfer element can be fluidly isolated from any other heat transfer elements.

In one arrangement, a flow sensor is provided on each heat transfer element. In an alternative arrangement, fewer flow sensors than heat transfer elements may be provided, for example at fluid junctions between heat transfer elements.

Optionally, the heat exchanger module further comprises a pressure sensor configured to detect a pressure of the first fluid contained within the heat transfer elements, and the heat exchanger module is configured to isolate a heat transfer element in the event that the detected pressure is outside of a predetermined acceptable pressure range.

By monitoring the pressure in the first fluid as it is flowing it becomes possible for a user to determine whether there is any leakage of the first fluid. The leaking heat transfer element can then be fluidly isolated from any other heat transfer elements. In one example, a fluid pressure sensor is positioned on a fluid line to or from each heat transfer element.

Optionally, the heat exchanger module comprises a plurality of radially-extending hollow vanes arranged in a circumferential array with a channel extending axially through the heat exchanger module between each two circumferentially adjacent vanes, each of the hollow vanes accommodating at least one heat transfer element.

In one arrangement of the present disclosure, each of the heat transfer elements is enclosed within a hollow vane, with the hollow vanes arranged in a circumferential array. Positioning the heat transfer elements inside a hollow vane provides a measure of physical protection to the heat transfer elements. The hollow vane also provides for the attachment of ancillary components such as isolation valves and fluid sensors.

According to another aspect of the present disclosure there is provided a method of operating a turbofan gas turbine engine, the gas turbine engine comprising, in axial flow sequence, a heat exchanger module, an inlet duct, a fan assembly, a compressor module, a turbine module, and an exhaust module, and wherein the method comprises the steps of:

(i) providing the fan assembly, the compressor module, the turbine module, and the exhaust module;

(ii) positioning the heat exchanger module in fluid communication with the fan assembly by the inlet duct;

(iii) providing the heat exchanger module with a plurality of heat transfer elements for the transfer of heat from a first fluid contained within the heat transfer elements to an airflow passing over a surface of the or each heat transfer element prior to entry of the airflow into an inlet to the fan assembly;

(iv) operating the gas turbine engine such that an airflow passing over a surface of the heat transfer element transfers heat energy from the first fluid contained within the heat transfer elements to the airflow;

(v) during operation of the gas turbine engine, monitoring an operational parameter of the first fluid passing through the heat transfer elements and, if the operational parameter is outside of a user-defined acceptable parameter range, isolating the respective heat transfer element from the remaining heat transfer elements.

In one arrangement of the present disclosure, the first fluid is an oil that is used to provide cooling to other parts of the turbofan engine. The oil is circulated through the heat transfer elements while the air flow passing over the heat transfer elements enables the rejection of heat energy from the oil to the air flow.

Any physical damage to the heat transfer element may result in leakage of the oil from the heat transfer element. Such physical damage might be caused to the heat transfer element by a foreign object carried through on the vane air flow.

Leakage of oil resulting from damage is undesirable since the oil is required for the heat rejection process. If more than a pre-determined quantity of oil is lost from the oil system, the turbofan engine may become inoperative. Additionally, the downstream air from the gas turbine engine, for example a compressor bleed, may be used for ventilation purposes and the presence of oil in such an air stream is undesirable.

The arrangement of the present disclosure enables a damaged heat transfer element to be isolated from the remaining heat transfer elements. This will prevent further oil loss from the damaged element and enable continued operation of the gas turbine engine albeit at perhaps slightly reduced heat energy rejection capability.

In one arrangement, a user may determine that a drop of, for example, 20% in the first fluid pressure may be indicative of a leak of the first fluid from one of the heat transfer elements. In other arrangements, a different degree of variation may be defined by the user.

Optionally, in step (v) the operational parameter of the first fluid is selected from the group comprising first fluid temperature, first fluid pressure, first fluid flow rate, and first fluid viscosity;

In one arrangement of the present disclosure, the flow rate of the first fluid is monitored to determine whether damage has occurred to a heat transfer element. In alternative arrangements, another property of the first fluid could be used for this purpose, such as, for example, fluid pressure, fluid temperature, fluid viscosity or fluid dielectric The skilled person will appreciate that a feature described above in relation to any one of the aspects may be applied, mutatis mutandis, to any other aspect of the invention. For example, in various embodiments any two or more of the conditions for ratios as defined above, and optionally all specified ratio ranges, may apply to any given aspect or embodiment. All aspects may apply to an engine of some embodiments. Furthermore, any feature described below may apply to any aspect and/or may apply in combination with any one of the claims.

As noted elsewhere herein, the present disclosure may relate to a turbofan gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core. The fan may comprise any number of stages, for example multiple stages. Each fan stage may comprise a row of fan blades and a row of stator vanes. The stator vanes may be variable stator vanes (in that their angle of incidence may be variable).

The turbofan gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any turbofan gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of compressor stages, for example multiple stages. Each compressor stage may comprise a row of rotor blades and a row of stator vanes. The stator vanes may be variable stator vanes (in that their angle of incidence may be variable). The row of rotor blades and the row of stator vanes may be axially offset from each other.

The or each turbine (for example the first turbine and second turbine as described above) may comprise any number of turbine stages, for example multiple stages. Each turbine stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.50, 0.49, 0.48, 0.47, 0.46, 0.45, 0.44, 0.43, 0.42, 0.41, 0.40, 0.39, 0.38, 0.37, 0.36, 0.35, 0.34, 0.33, 0.32, 0.31, 0.30, 0.29, or 0.28. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 50 cm, 60 cm, 70 cm (around 27.5 inches), 80 cm (around 31.5 inches), 90 cm, 100 cm (around 39 inches), 110 cm (around 43 inches), 120 cm (around 47 inches), 130 cm (around 51 inches), 140 cm (around 55 inches), 150 cm (around 59 inches), or 160 cm (around 130 inches). The fan diameter may be in an inclusive range bounded by any two of the values in the previous sentence (i.e. the values may form upper or lower bounds), for example in the range of from 50 cm to 70 cm or 90 cm to 130 cm.

The fan face area may be equal to π multiplied by the square of the fan tip radius.

The rotational speed of the fan may vary in use. Generally, the rotational speed is lower for fans with a higher diameter. Purely by way of non-limitative example, the rotational speed of the fan at cruise conditions may be less than 10000 rpm, for example less than 9000 rpm. Purely by way of further non-limitative example, the rotational speed of the fan at cruise conditions for an engine having a fan diameter in the range of from 50 cm to 90 cm (for example 60 cm to 80 cm or 65 cm to 75 cm) may be in the range of from 7000 rpm to 10000 rpm, for example in the range of from 7500 rpm to 10000 rpm, for example in the range of from 8000 rpm to 9000 rpm. Purely by way of further non-limitative example, the rotational speed of the fan at cruise conditions for an engine having a fan diameter in the range of from 90 cm to 150 cm may be in the range of from 7000 rpm to 9000 rpm, for example in the range of from 7500 rpm to 8600 rpm, for example in the range of from 8000 rpm to 8600 rpm.

In use of the turbofan gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.22, 0.23, 0.24, 0.25, 0.26, 0.27, 0.28, 0.29, 0.30, 0.31, 0.32, 0.33, 0.34, 0.35, 0.36, 0.37, 0.38, 0.39 or 0.40 (all values being dimensionless). The fan tip loading may be in an inclusive range bounded by any two of the values in the previous sentence (i.e. the values may form upper or lower bounds), for example in the range of from 0.28 to 0.31, or 0.29 to 0.30.

Turbofan gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 0.4, 0.5, 0.6, 0.7, 0.8, 0.9, 1.0, 1.1, 1.2, 1.3, 1.4, or 1.5. The bypass ratio may be in an inclusive range bounded by any two of the values in the previous sentence (i.e. the values may form upper or lower bounds), for example in the range of form of 0.4 to 1.0, 0.5 to 0.9, or 0.6 to 0.9. The bypass duct may be substantially annular. The bypass duct may be radially outside the core engine. The radially outer surface of the bypass duct may be defined by a nacelle and/or a fan case.

The overall pressure ratio of a turbofan gas turbine engine as described and/or claimed herein may be defined as the ratio of the stagnation pressure upstream of the fan to the stagnation pressure at the exit of the highest-pressure compressor (before entry into the combustor). By way of non-limitative example, the overall pressure ratio of a gas turbine engine as described and/or claimed herein at cruise may be greater than (or on the order of) any of the following: 10, 15, 20, 25, 30, 35 or 40. The overall pressure ratio may be in an inclusive range bounded by any two of the values in the previous sentence (i.e. the values may form upper or lower bounds), for example in the range of from 20 to 35.

Specific thrust of a turbofan gas turbine engine may be defined as the net thrust of the engine divided by the total mass flow through the engine. At cruise conditions, the specific thrust of an engine described and/or claimed herein may be less than (or on the order of) any of the following: 300 Nkg$^{-1}$s, 350 Nkg$^{-1}$s, 400 Nkg$^{-1}$s, 450 Nkg$^{-1}$s, 500 Nkg$^{-1}$s, 550 Nkg$^{-1}$s, 600 Nkg$^{-1}$s, 650 Nkg$^{-1}$s or 700 Nkg$^{-1}$s. The specific thrust may be in an inclusive range bounded by any two of the values in the previous sentence (i.e. the values may form upper or lower bounds), for example in the range of from 300 Nkg$^{-1}$s to 450 Nkg$^{-1}$s, or 450 Nkg$^{-1}$s to 600 Nkg$^{-1}$s. Such engines may be particularly efficient in comparison with conventional gas turbine engines.

A turbofan gas turbine engine as described and/or claimed herein may have any desired maximum thrust. Purely by way of non-limitative example, a gas turbine as described and/or claimed herein may be capable of producing a maximum thrust of at least (or on the order of) any of the following: 20 kN, 40 kN, 60 kN, 80 kN, 100 kN, 120 kN, 140 kN, 160 kN, 180 kN, or 200 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 60 kN to 160 kN, for example 70 kN to 120 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high-pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K, 2000K, 2050K, 2100K, 2150K, 2200K, 2250K or 2300K. The maximum TET may be in an inclusive range bounded by any two of the values in the previous sentence (i.e. the values may form upper or lower bounds), for example in the range of from 1800K to 2200K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium-based metal or an aluminium-based material (such as an aluminium-lithium alloy) or a steel-based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The turbofan gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a turbofan gas turbine engine as described and/or claimed herein may have any desired number of fan blades, for example 12, 14, 16, 18, 20, 22, 24 or 26 fan blades.

As used herein, cruise conditions have the conventional meaning and would be readily understood by the skilled person. Thus, for a given turbofan gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given turbofan gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.5 to 0.9, for example 0.55 to 0.65, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 40 kN to 65 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 70 kN to 95 kN) at a forward Mach number of 0.85 and standard atmospheric conditions (according to the International Standard Atmosphere) at an altitude of 35000 ft (10668 m).

In use, a turbofan gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect of the disclosure, there is provided an aircraft comprising a turbofan gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect of the disclosure, there is provided a method of operating a turbofan gas turbine engine as described and/or claimed herein. The operation may be at the cruise conditions as defined elsewhere herein (for example in terms of the thrust, atmospheric conditions and Mach Number).

According to an aspect of the disclosure, there is provided a method of operating an aircraft comprising a turbofan gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which:

FIG. 9A shows a schematic axial sectional view across one of the vanes of the vane array of the heat exchanger module of FIG. 4 with the flow modulator forming the exhaust portion of the vane, and the modulator in a 'open' position; and FIG. 9B shows a schematic axial sectional view of the vane of FIG. 9A with the modulator in a 'closed' position.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
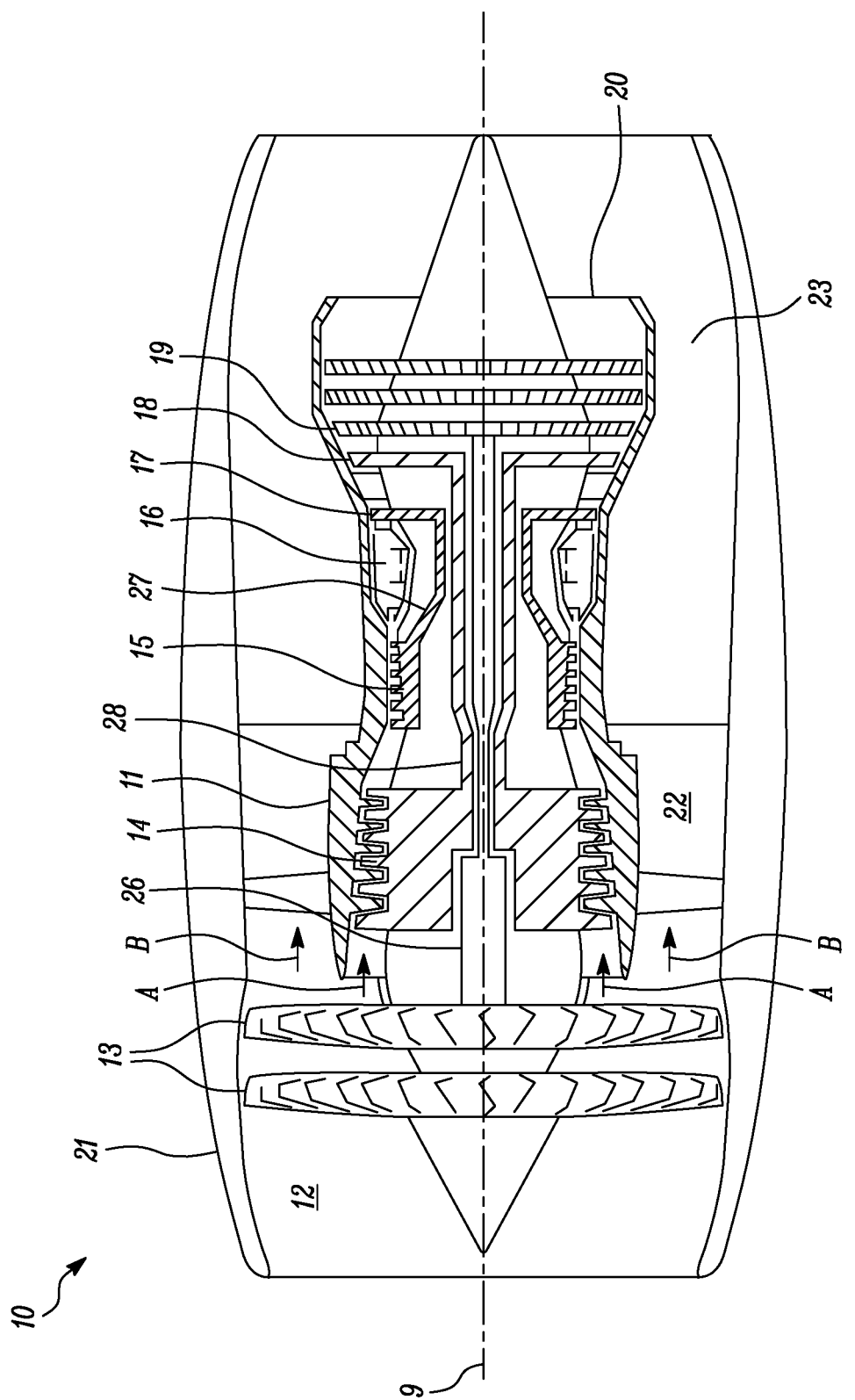
FIG. 1 shows a schematic part-sectional view of a turbofan gas turbine engine according to the prior art.

FIG. 1 illustrates a conventional turbofan gas turbine engine 10 having a principal rotational axis 9. The engine 10 comprises an air intake 12 and a two-stage propulsive fan 13 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, an intermediate-pressure turbine 18, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 13 is attached to and driven by the low-pressure turbine 19 via a shaft 26.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high-pressure, intermediate-pressure, and low-pressure turbines 17, 18, 19 before being exhausted through the nozzle 20 to provide some propulsive thrust. The high-pressure turbine 17 drives the high-pressure compressor 15 by a suitable interconnecting shaft 27. The low-pressure compressor 14 drives the intermediate-pressure turbine 18 via a shaft 28.

Note that the terms "low-pressure turbine" and "low-pressure compressor" as used herein may be taken to mean the lowest pressure turbine stages and lowest pressure compressor stages (i.e. not including the fan 13) respectively and/or the turbine and compressor stages that are connected together by the interconnecting shaft 26 with the lowest rotational speed in the engine. In some literature, the "low-pressure turbine" and "low-pressure compressor" referred to herein may alternatively be known as the "intermediate-pressure turbine" and "intermediate-pressure compressor". Where such alternative nomenclature is used, the fan 13 may be referred to as a first, or lowest pressure, compression stage.

Other turbofan gas turbine engines to which the present disclosure may be applied may have alternative configurations. For example, such engines may have an alternative number of fans and/or compressors and/or turbines and/or an alternative number of interconnecting shafts. By way of further example, the gas turbine engine shown in FIG. 1 has a split flow nozzle 20, 23 meaning that the flow through the bypass duct 22 has its own nozzle 23 that is separate to and radially outside the core engine nozzle 20. However, this is not limiting, and any aspect of the present disclosure may also apply to engines in which the flow through the bypass duct 22 and the flow through the core engine 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the turbofan gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 2:
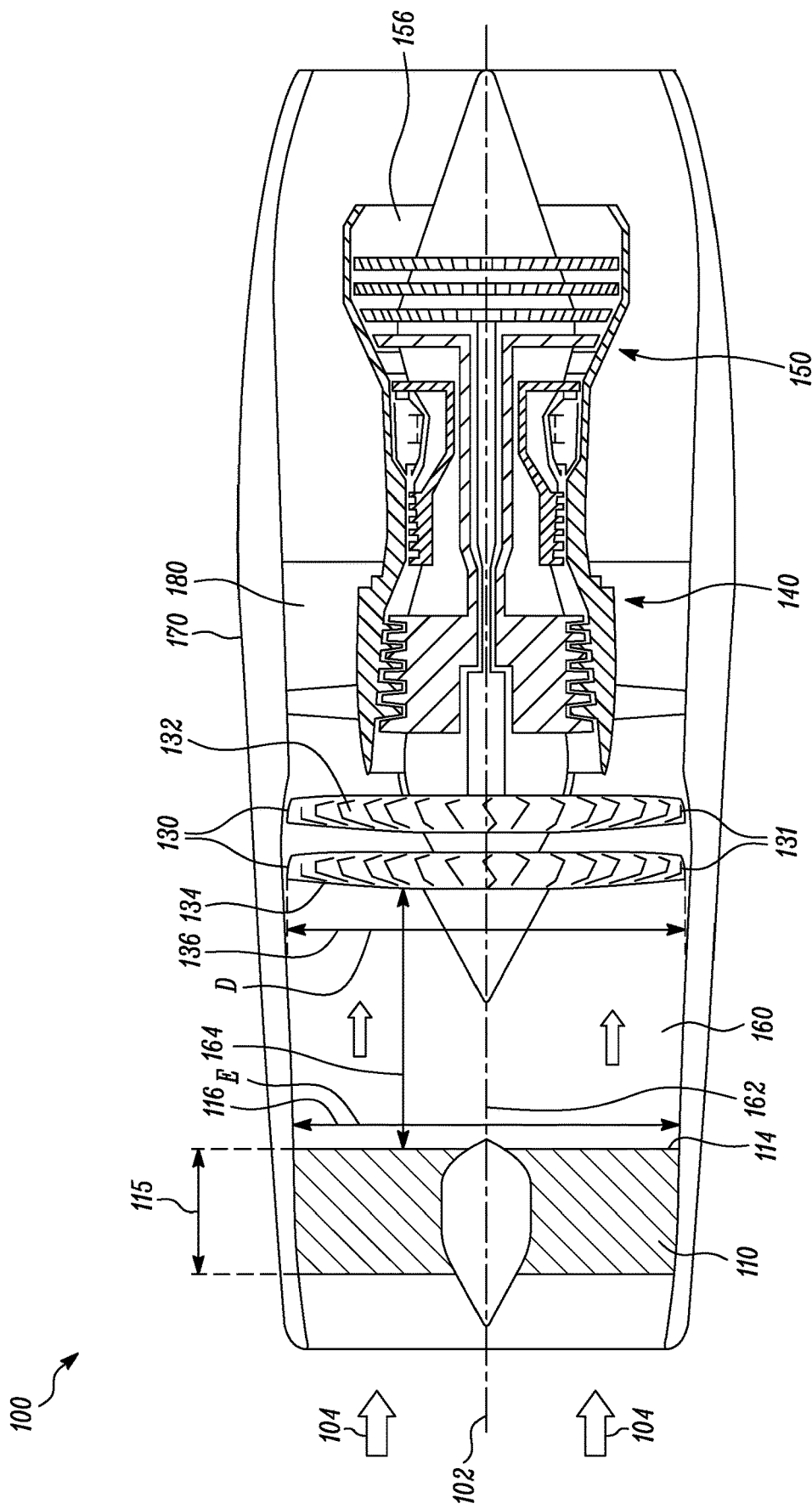
FIG. 2 shows a schematic part-sectional view of a turbofan gas turbine engine according to a first embodiment of the disclosure.

Referring to FIG. 2, a turbofan gas turbine engine according to a first embodiment of the disclosure is designated generally by the reference numeral 100. The turbofan gas turbine engine 100 comprises in axial flow sequence, a heat exchanger module 110, a fan assembly 130, a compressor module 140, a turbine module 150, and an exhaust module 156.

In the present arrangement, the fan assembly 130 comprises two fan stages 131, with each fan stage 131 comprising a plurality of fan blades 132. In the present arrangement each fan stage 131 has the same fan diameter 136, with the respective plurality of fan blades defining a fan diameter of 0.9 m. In an alternative arrangement, the two fan stages 131 may have different fan diameters 136 each defined by the corresponding plurality of fan blades 132. As previously mentioned, the fan diameter (D) 136 is defined by a circle circumscribed by the leading edges of the respective plurality of fan blades 132.

Figure 4:
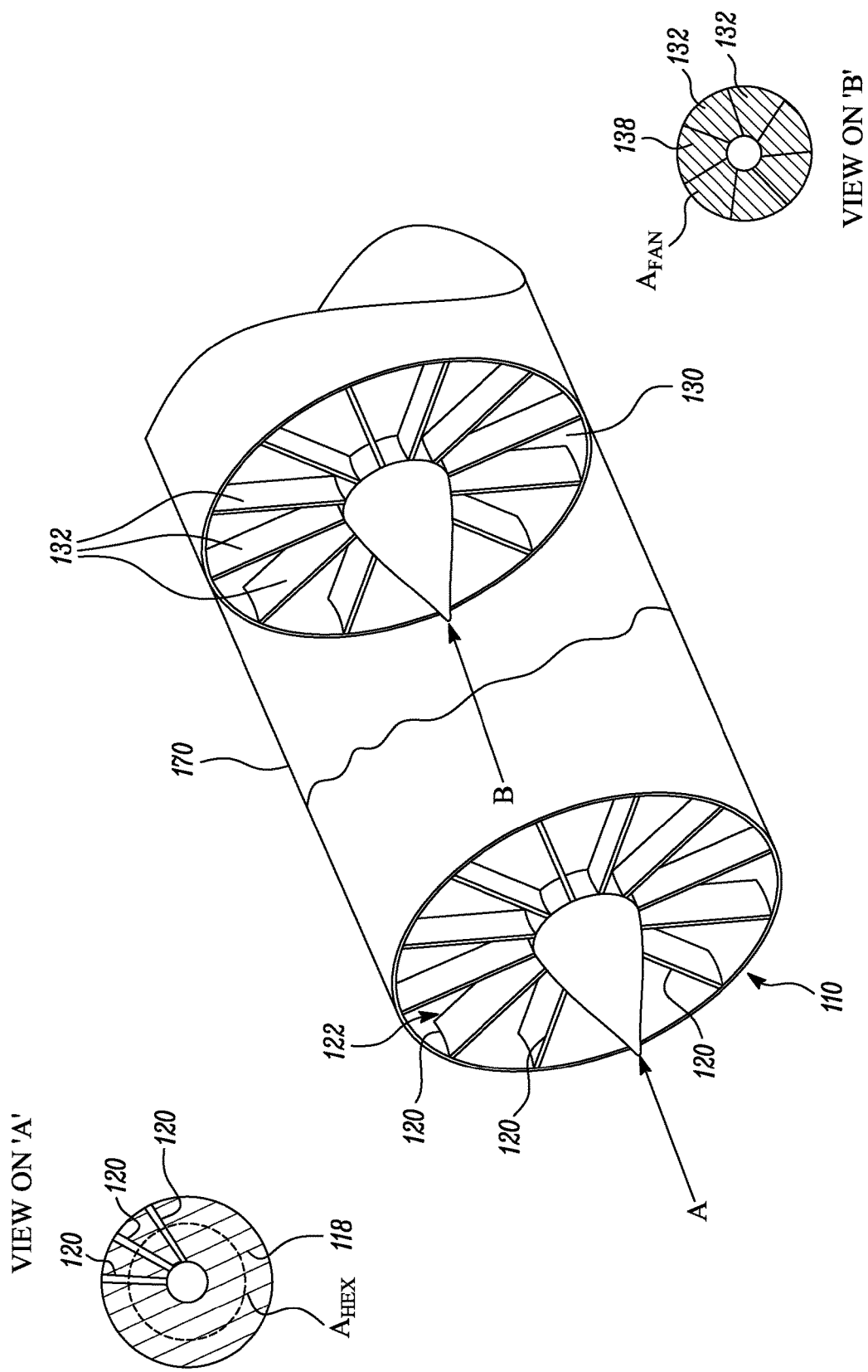
FIG. 4 shows a perspective schematic view of the heat exchanger module of the turbofan engine of FIG. 2 showing the circumferential array of vanes forming the heat exchanger module.

FIG. 4 shows a perspective view of the heat exchanger module 110 and fan assembly 130 of the turbofan gas turbine engine 100 according to the first embodiment. The heat exchanger module 110 comprises twelve radially extending vanes 120 arranged in an equi-spaced circumferential array 122 with a channel 124 extending axially between each pair of adjacent hollow vanes 120. Alternative embodiments may have more or fewer radially extending vanes 120.

Figure 6:
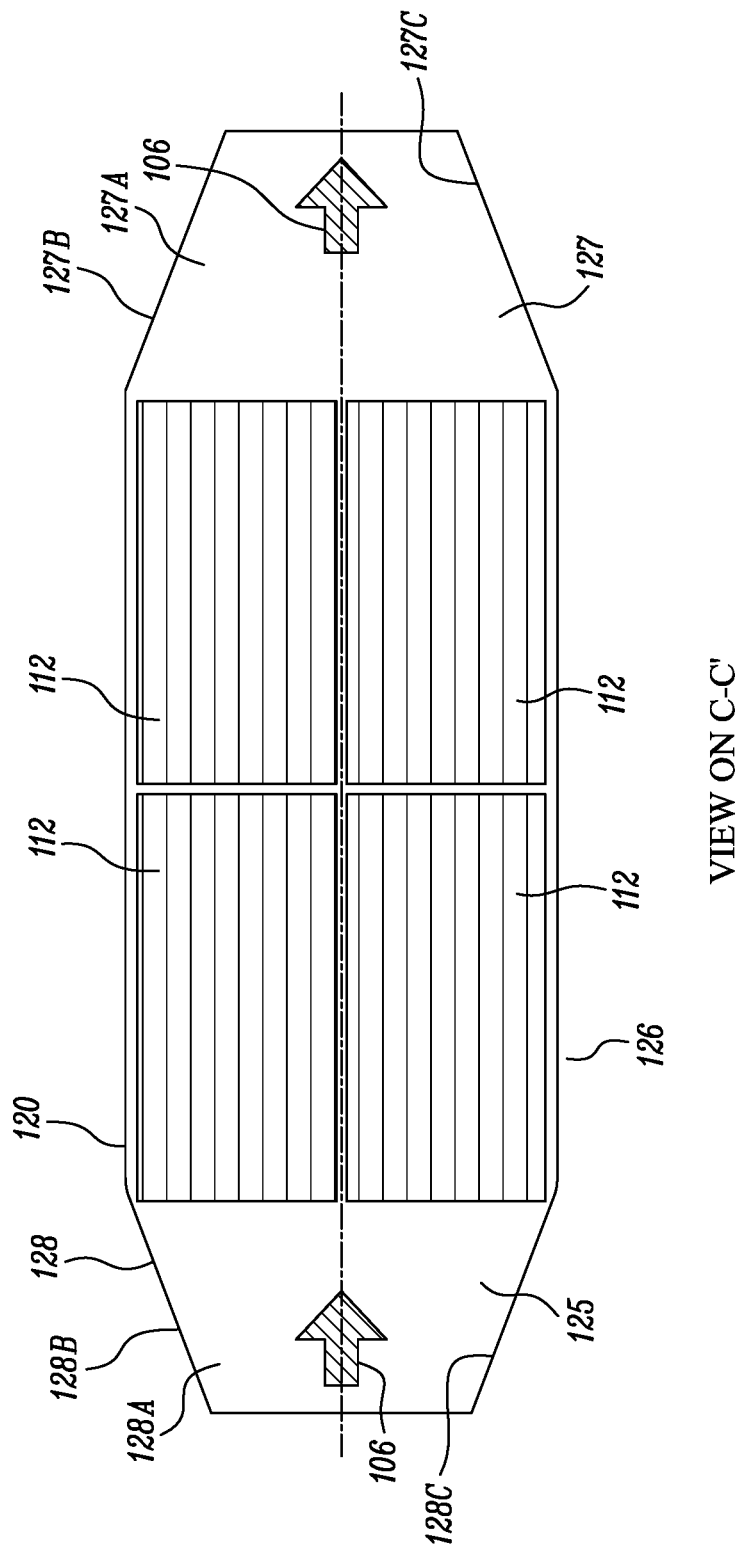
FIG. 6 shows a schematic axial sectional view across one of the vanes of the vane array of the heat exchanger module of FIG. 4.

Each of the vanes 120 is hollow and comprises four heat transfer elements 112 arranged in a 2×2 configuration extending axially along the hollow interior of the vane 120, as shown in FIG. 6. Alternative embodiments may not have a heat transfer element 112 within each vane 120 or may have a different number of heat transfer elements 112 in any single vane 120.

Each of the heat transfer elements 112 has a corresponding swept area, which is the area of the heat transfer element 112 that is contacted by the air flow 104. In the present arrangement, the total swept heat transfer element area ($A_{HTE}$) is the sum of the swept area of each of the individual heat transfer elements 112.

Each vane 120 is configured to allow the incoming airflow 104 passing through the heat exchange module 110 to pass through the hollow portion of the vane 120 and thence to flow over the respective heat transfer element 112. In this way heat energy is transferred from the first fluid 190 to the air flow 104.

Figure 5:
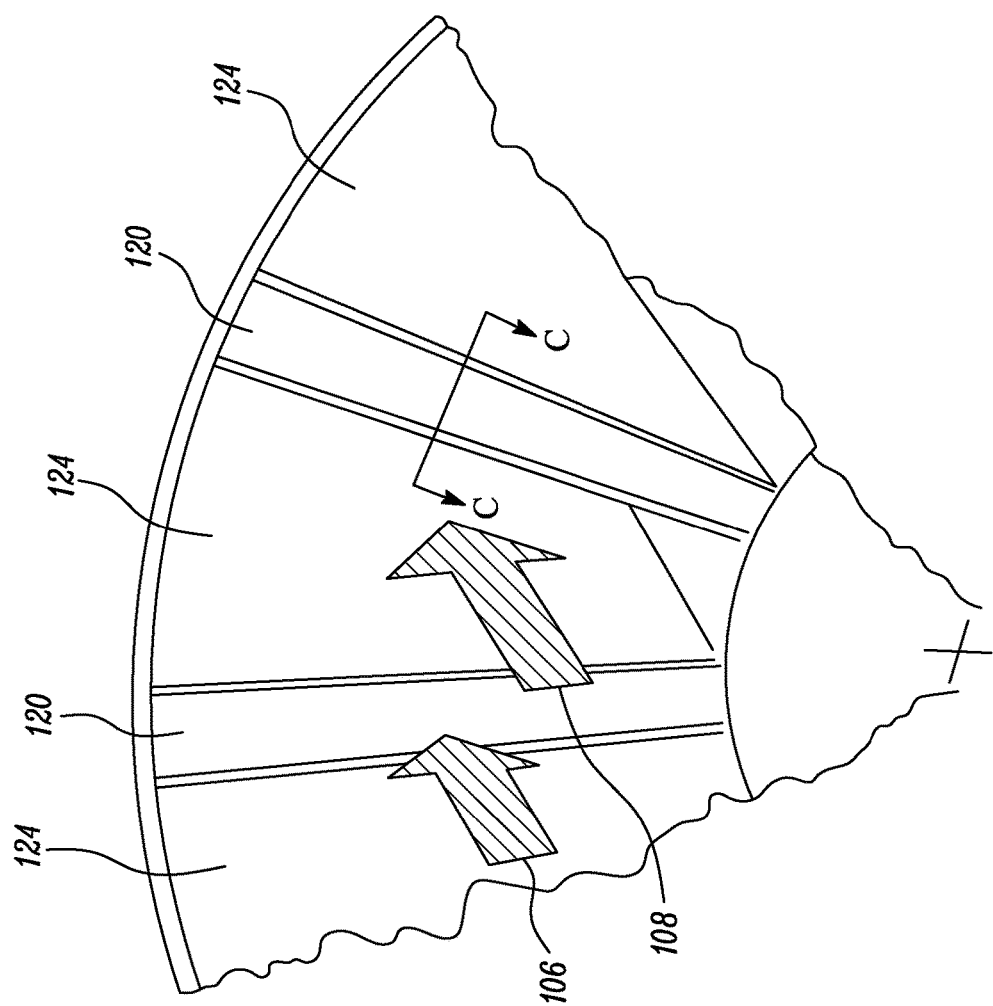
FIG. 5 shows a schematic part-sectional view of a part of the vane array of the heat exchanger module of FIG. 4.

In use, as illustrated in FIG. 5, an airflow 104 entering the heat exchanger module 110 is divided between a set of vane airflows 106 through each of the hollow vanes 120 and a set of channel airflows 108 through each of the channels 124. Each of the vane airflows 106 has a vane mass flowrate $Flow_{Vane}$. Each of the channel airflows 108 has a channel mass flowrate $Flow_{Chan}$.

A Vane Airflow Ratio parameter $V_{AR}$ is defined as:

$$VAR = \frac{Flow_{VaneTot}}{Flow_{ChanTot}}$$

where:
$Flow_{VaneTot}$=total mass flow rate of the vane mass flow rates, $Flow_{Vane}$; and
$Flow_{ChanTot}$=total mass flow rate of the channel mass flow rates, $Flow_{Chan}$ In the present embodiment, the VAR parameter is 1.0. In other words, in this arrangement the incoming airflow 104 is divided equally between the vane airflows 106 and the channel airflows 108.

FIG. 6 shows an axial cross-section through one of the hollow vanes 120 and corresponds to the Section on 'C-C' from FIG. 5. Each of the hollow vanes 120 comprises, in axial flow sequence, an inlet portion 125, a heat transfer portion 126, and an exhaust portion 127.

The inlet portion 125 comprises a diffuser element 128. The diffuser element 128 takes the form of an axially-extending first duct 128A. The first duct 128A has an axial cross-section 128B that has a linearly divergent profile 128C. In use, the diffuser element 128 acts to slow the incoming airflow 104 to the vane airflow 106. The diffuser element 128 is sized such that the vane mass flow rate $Flow_{Vane}$ is less than the channel mass flow rate $Flow_{Chan}$ by a user-defined margin.

The heat transfer portion 126 accommodates the heat transfer elements 112. Finally, the exhaust portion 127 comprises an axially-extending second duct 127A having an axial cross-section 127B that in turn has a linearly convergent profile 127C.

Figure 7:
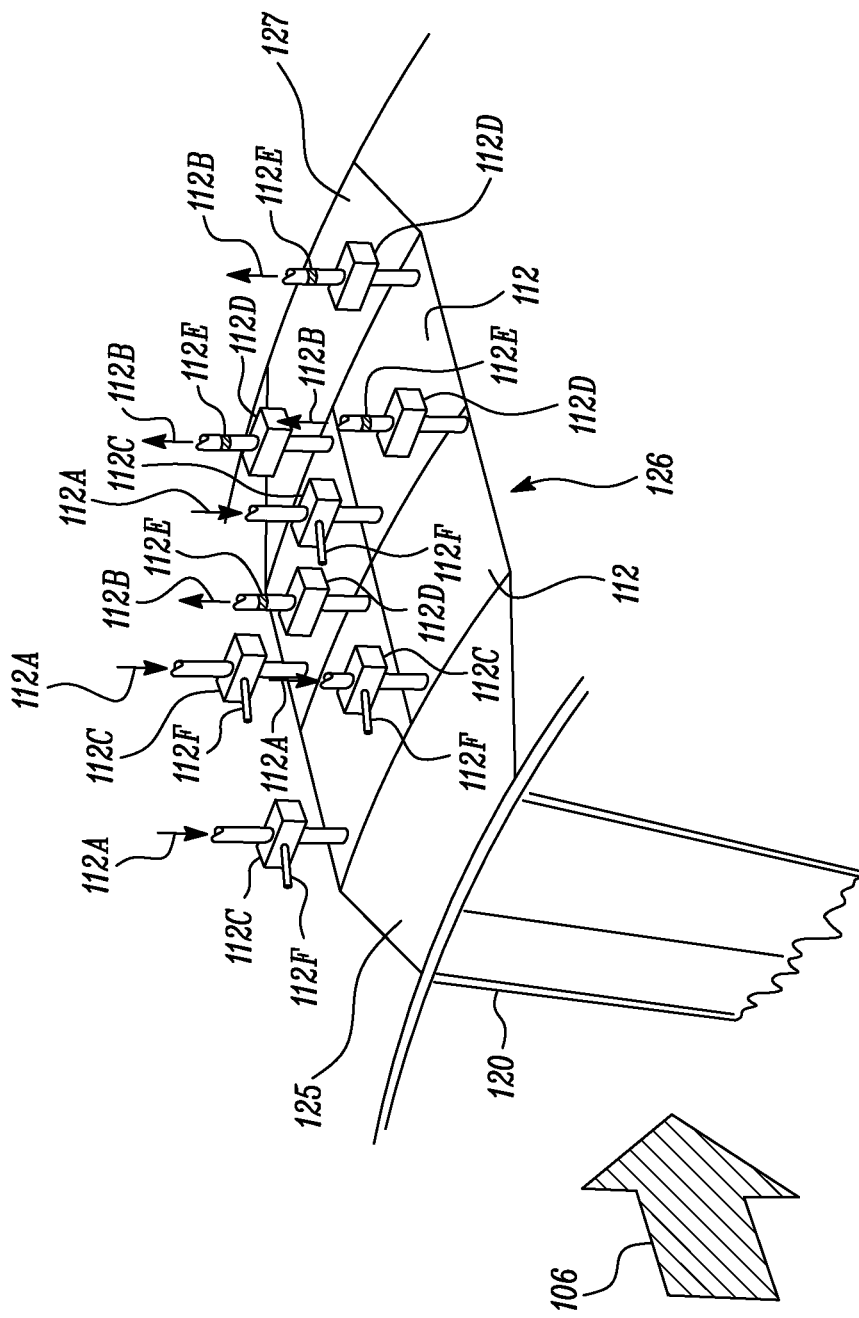
FIG. 7 shows a perspective schematic view of a heat transfer element of the heat exchanger module of FIG. 4.

FIG. 7 shows a perspective schematic view of a radially outward facing surface of a hollow vane 120. As outlined above, in this embodiment each vane is provided with four heat transfer elements 112 arranged in a 2×2 formation. Each of the heat transfer elements 112 has a fluid inlet 112A and a corresponding fluid outlet 112B. The fluid inlet 112A provides a feed of hot oil (not shown) to the respective heat transfer element 112. Each of the fluid inlets 112A is provided with an actuatable inlet valve 112C that can be switched to cut off the fluid flow into the heat transfer element 112. Additionally, each of the fluid outlets 1126 is provided with an actuatable inlet valve 112D that can also be controlled to cut off the fluid flow leaving the heat transfer element 112.

Each of the fluid inlet valves 112C is provided with a fluid pressure sensor 112F that monitors the pressure of the oil flowing through the inlet 112A. In response to a sensed drop in the fluid pressure as measured by the pressure sensor 112F, the inlet valve 112C may be actuated to cut-off the oil flow through the respective heat transfer element 112. In this arrangement, the outlet valve 112D is also actuated in response to a loss of oil pressure to thereby isolate the corresponding heat transfer element 112 from the remaining oil flow.

Each of the fluid outlets 1126 is provided with a fluid flow sensor 112E. In the event of a drop in fluid flow rate as detected by the flow sensor 112E, the corresponding fluid outlet valve 112D (and in this arrangement, the corresponding fluid inlet valve 112C) can be actuated to cut off the oil flow through the heat transfer element 112.

In addition to, or in an alternative to, the diffuser element 128 described above, the hollow vane 120 may be provided with a flow modulator 120A. The flow modulator 120A is configured to actively regulate the vane airflow 106 as a proportion of a total airflow 104 entering the heat exchanger module 110 in response to a user requirement. In other words, the flow modulator 120A provides a user with the ability to actively change the vane mass flowrate $Flow_{VaneTot}$ as a proportion of the airflow 104 entering the turbofan engine.

Figure 8A:
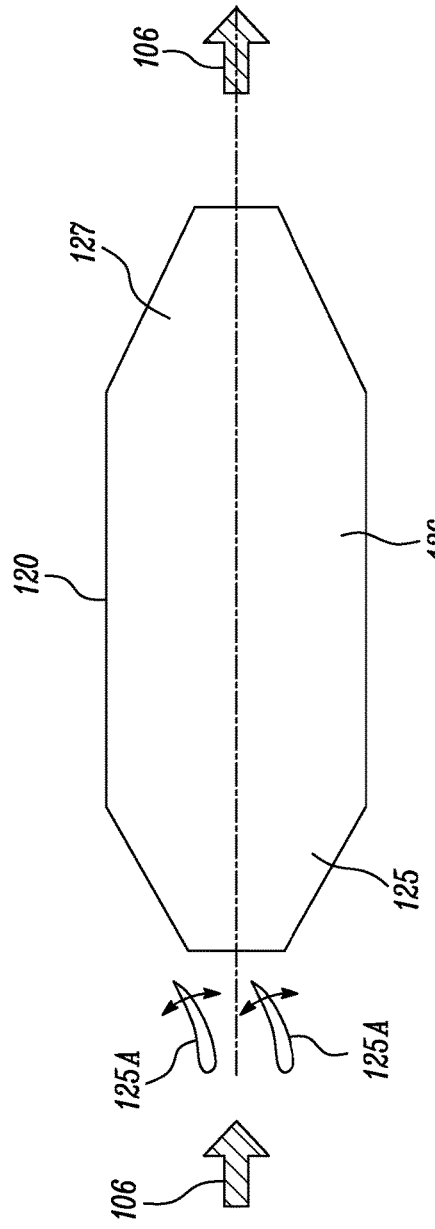
FIG. 8A shows a schematic view of the vane of FIG. 6 with a flow modulator in the form of first vanes arranged upstream of the inlet to the vane.

In one arrangement, shown in FIG. 8A, the flow modulator 120A takes the form of first vanes 125A positioned upstream of the inlet portion 125 of the hollow vane 120. The first vanes 125A are actuatable to restrict the vane airflow 106 in response to the user requirement to change the ratio of the mass airflows between the hollow vane and the channel.

The first vanes 125A also provide a measure of protection to the heat transfer elements 112 positioned inside the hollow vane 120 from foreign object damage caused by debris or other objects entering the hollow vane 120.

Figure 8B:
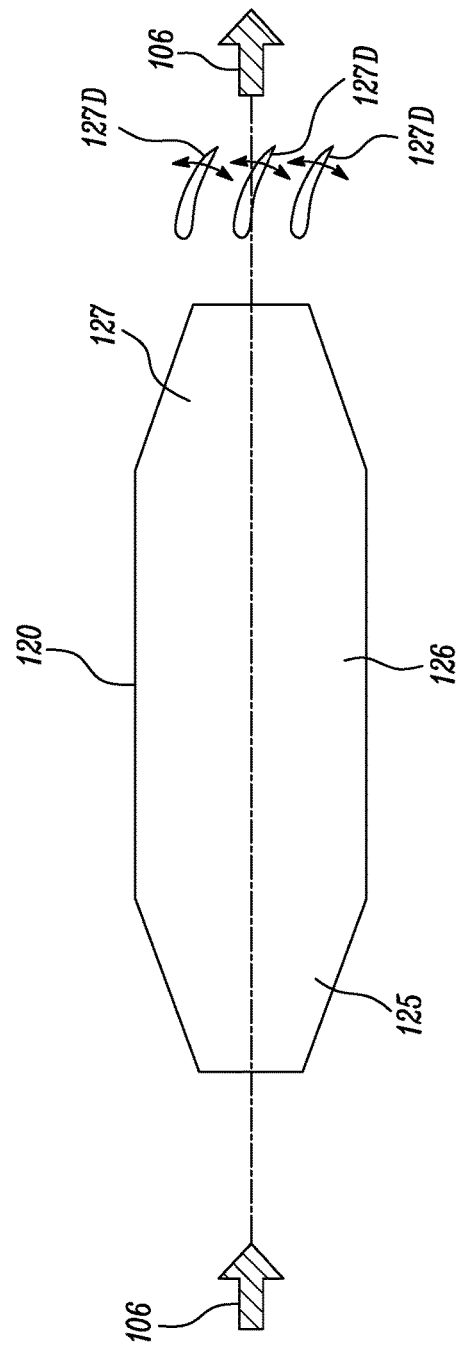
FIG. 8B; shows a schematic view of the vane of FIG. 6 with a flow modulator in the form of second vanes arranged downstream of the exhaust from the vane.

FIG. 8B illustrates an alternative arrangement for the flow modulator 120A in which second vanes 127D are positioned downstream of the exhaust portion 127 of the hollow vane 120. These second vanes 127D are actuatable to restrict the vane airflow 106 in response to the user requirement to change the ratio of the mass airflows between the hollow vane 120 and the channel 124.

Figure 8C:
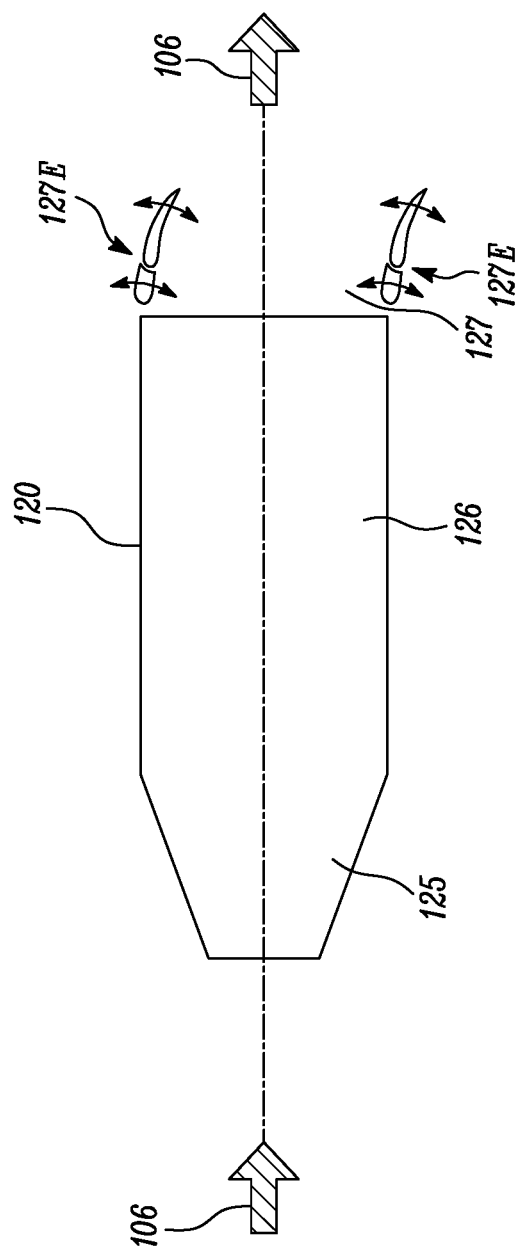
FIG. 8C shows a schematic view of the vane of FIG. 6 with a flow modulator in the form of a VIGV array.

In a further alternative arrangement, FIG. 8C illustrates a flow modulator 127E that takes the form of the exhaust portion 127 itself. In this arrangement, the heat exchange module 110 is close-coupled to an actuatable variable inlet guide vane (VIGV) array 127E. The close-coupling configuration provides for the fan assembly 130 to effectively 'suck' the incoming air flow 104 through both the hollow vanes 120 and the channels 124. Such an arrangement also enables the inlet duct 160 to be shorter provides for an axially more compact turbofan gas turbine engine.

A further alternative form of the flow modulator 120A is illustrated in FIGS. 9A and 9B. In this arrangement the exhaust portion 127 of the hollow vane 120 is formed as the flow modulator 120A. In other words, the exhaust portion 127 is configured to change its shape in response to the user requirement to change the ratio of the mass airflows between the hollow vane 120 and the channel 124.

In the example shown in FIGS. 9A and 9B the exhaust portion 127 is formed from a shape memory alloy material. When the heat transfer elements 112 are in use the temperature of the vane airflow 106 will increase and the flow modulator 120A will open to thereby allow increased vane mass airflow $Flow_{Vane}$. Conversely when the heat transfer elements 112 are not in use the vane airflow 106 will have a lower temperature, causing the flow modulator 120A to close and restrict the vane mass airflow $Flow_{Vane}$. This will therefore reduce the aerodynamic losses associated with flow through the hollow vanes 120 when the heat transfer capability of the heat transfer elements 112 is not required.

The heat exchanger module 110 is in fluid communication with the fan assembly 130 by an inlet duct 160. The heat exchange module 110 has an axial length 115 of 0.4 m, this being 0.4 times the fan diameter of 0.9 m.

The inlet duct 160 extends between a downstream-most face of the heat transfer elements and an upstream-most face of the fan assembly. In the present arrangement, the inlet duct 160 is linear. However, in other arrangements the inlet duct 160 may be curved or convoluted.

The inlet duct 160 has a fluid path length 164 of 3.6 m, this being 4.0 times the fan diameter of 0.9 m. The fluid path length 164 extends along a central axis 162 of the inlet duct 160.

As outlined earlier, the heat exchanger module 110 has a flow area ($A_{HEX}$) 118. The heat exchanger module flow area 118 is the cross-sectional area of the heat exchanger module 110 through which an air flow 104 passes before being ingested by the fan assembly 130. In the present arrangement, the heat exchanger module flow area 118 has an annular cross-section and corresponds directly to the shape of the air flow passing through the heat exchanger module 110.

The fan assembly 130 has a corresponding flow area ($A_{FAN}$) 138. The fan assembly flow area 138 is the cross-sectional area of the fan assembly 130 through which an air flow 104 passes before separating into a core engine flow and a bypass flow. The fan assembly flow area 138 has an annular shape since it corresponds to the annular area swept by the fan blades 132.

In the present arrangement, the heat exchanger module flow area 118 is equal to the fan assembly flow area 138, and the corresponding ratio of $A_{HEX}/A_{FAN}$ is equal to 1.0.

The heat exchanger module 110 has a flow diameter (E) 116, which is the diameter of the air flow passing through the heat exchanger module 110. In the present arrangement, the heat exchanger module flow diameter 116 is equal to the fan diameter 136.

The heat exchanger module 110 comprises a plurality of heat transfer elements 112 for the transfer of heat energy from a first fluid 190 contained within the heat transfer elements 112 to an airflow 104 passing over a surface 113 of the heat transfer elements 112 prior to entry of the airflow 104 into the fan assembly 130. In the present embodiment, the first fluid 190 is a mineral oil. In other arrangements, the first fluid 190 may be an alternative heat transfer fluid such as, for example, a water-based fluid, or the fuel used by the turbofan gas turbine engine.

The heat transfer elements 112 have a conventional tube and fin construction and will not be described further. In an alternative arrangement, the heat transfer elements may have a different construction such as, for example, plate and shell.

The turbofan gas turbine engine 100 further comprises an outer housing 170. The outer housing 170 fully encloses the sequential arrangement of the heat exchanger module 110, inlet duct 160, fan assembly 130, compressor module 140, and turbine module 150. The outer housing 170 defines a bypass duct 180 between the outer housing 170 and the core engine components (comprising inter alia the compressor module 140 and the turbine module 150). In the present arrangement, the bypass duct 180 has a generally axisymmetrical annular cross-section extending over the core engine components. In other arrangements, the bypass duct 180 may have a non-symmetric annular cross-section or may not extend around a complete circumference of the core engine components.

Figure 3:
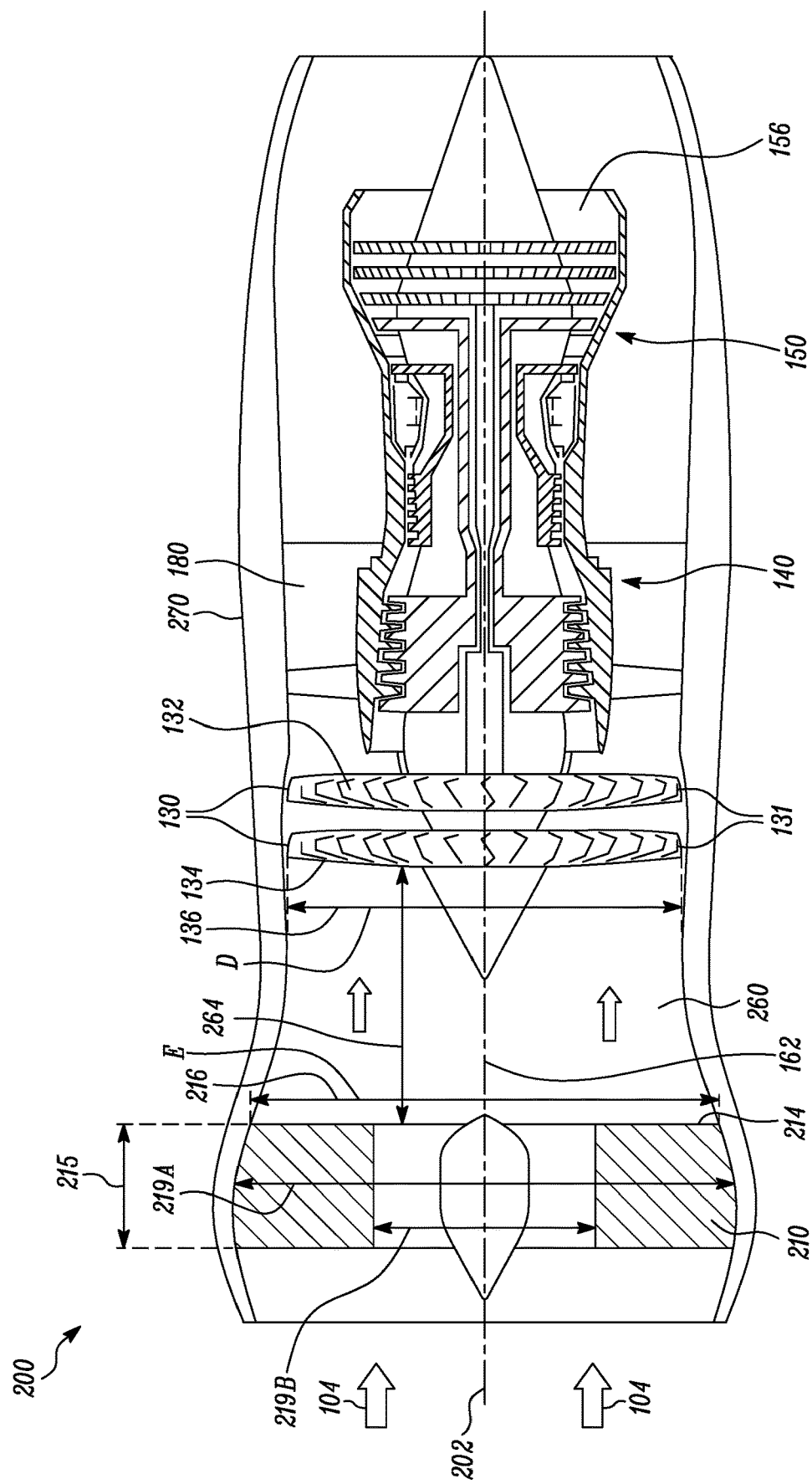
FIG. 3 shows a schematic part-sectional view of a turbofan gas turbine engine according to a second embodiment of the disclosure.

Referring to FIG. 3, a turbofan gas turbine engine according to a second embodiment of the disclosure is designated generally by the reference numeral 200. Features of the turbofan gas turbine engine 200 which correspond to those of turbofan gas turbine engine 100 have been given corresponding reference numerals for ease of reference.

The turbofan gas turbine engine 200 comprises in axial flow sequence, a heat exchanger module 210, a fan assembly 130, a compressor module 140, and a turbine module 150.

The fan assembly 130, compressor module 140, and turbine module 150 correspond directly to the those of the first embodiment described above.

The heat exchanger module 210 comprises a plurality of heat transfer elements 212 and is also in fluid communication with the fan assembly 130 by an inlet duct 260. As in the first embodiment, the inlet duct 260 extends between a downstream-most face of the heat transfer elements and an upstream-most face of the fan assembly.

The inlet duct 260 has a fluid path length 264 along a central axis 162 of the inlet duct 260 of 2.4 m, this being 2.7 times the fan diameter of 0.9 m.

The heat exchanger module 210 has a flow area ($A_{HEX}$) 218. As in the first embodiment, the heat exchanger module flow area 118 is annular in cross-section. However, in this arrangement the heat transfer elements 212 do not extend completely across that cross-section of the heat exchange module 210 that is available for the flow 104. In other words, there is a radially proximal portion of the cross-section of the heat transfer module across which there are no heat transfer elements 212.

The fan assembly 130 has a flow area ($A_{FAN}$) 138 that, as described above, has an annular shape corresponding to the annular area swept by the fan blades 132.

In the present arrangement, despite the heat exchanger module flow area 218 having different dimensions to the fan assembly flow area 138, the heat exchanger module flow area 218 is equal to the fan assembly flow area 138. As for the first embodiment, the corresponding ratio of $A_{HEX}/A_{FAN}$ is equal to 1.0.

The heat exchanger module 210 has a flow diameter 216. The heat exchanger module flow diameter 216 is greater than the fan diameter 136.

The turbofan gas turbine engine 200 further comprises an outer housing 270. As with the first embodiment described above, the outer housing 170 fully encloses the sequential arrangement of the heat exchanger module 210, inlet duct 260, fan assembly 130, compressor module 140, and turbine module 150. The outer housing 270 also defines an annular bypass duct 180 between the outer housing 170 and the core engine components In use the turbofan gas turbine engine 200 functions in the same manner as described above in relation to the turbofan gas turbine engine 100 of the first embodiment.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

In addition, where a range of values is provided, it is understood that every intervening value, between the upper and lower limit of that range and any other stated or intervening value in that stated range, is encompassed within the invention.

Except where mutually exclusive, any of the features may be employed separately or in combination with any other features and the disclosure extends to and includes all combinations and sub-combinations of one or more features described herein.

What is claimed is:

1. A turbofan gas turbine engine comprising, in axial flow sequence, a heat exchanger module, a fan assembly, a compressor module, a turbine module, and an exhaust module, the fan assembly comprising a plurality of fan blades defining a fan diameter, the heat exchanger module being in fluid communication with the fan assembly by an inlet duct, the heat exchanger module further comprising a plurality of radially-extending hollow vanes arranged in a circumferential array, with a channel extending axially between adjacent hollow vanes, each of the hollow vanes accommodating at least one heat transfer element for the transfer of heat from a first fluid contained within the or each heat transfer element to a corresponding vane airflow passing through the hollow vane and over a surface of the or each heat transfer element, each of the hollow vanes further comprising a flow modulator, the flow modulator being configured to actively regulate the vane airflow as a proportion of a total airflow entering the heat exchanger module in response to a user requirement, wherein the flow modulator includes a plurality of vanes.

2. The turbofan gas turbine engine as claimed in claim 1, wherein the airflow entering the heat exchange module is divided between the set of vane airflows through each hollow vane, each vane airflow having a vane mass flow rate, and a set of channel airflows through each channel, each channel air flow having a channel mass flow rate, and the flow modulator is configured to actively regulate a ratio between a sum of the vane mass flow rates and a sum of the channel mass flow rates.

3. The turbofan gas turbine engine as claimed in claim 2, wherein each hollow vane comprises, in axial flow sequence, an inlet portion, the at least one heat transfer element, and an exhaust portion, and the exhaust portion comprises a shape memory material that is configured to restrict the vane airflow in response to the user requirement.

4. The turbofan gas turbine engine as claimed in claim 1, wherein each hollow vane comprises, in axial flow sequence, an inlet portion, the at least one heat transfer element, and an exhaust portion, and the plurality of vanes includes one or more first vanes positioned upstream of the inlet portion, the first vanes being configured to restrict the vane airflow in response to the user requirement.

5. The turbofan gas turbine engine as claimed in claim 4, wherein each hollow vane comprises, in axial flow sequence, an inlet portion, the at least one heat transfer element, and an exhaust portion, and the exhaust portion comprises a shape memory material that is configured to restrict the vane airflow in response to the user requirement.

6. The turbofan gas turbine engine as claimed in claim 1, wherein each hollow vane comprises, in axial flow sequence, an inlet portion, the at least one heat transfer element, and an exhaust portion, and the exhaust portion comprises a shape memory material that is configured to restrict the vane airflow in response to the user requirement.

7. The turbofan gas turbine engine as claimed in claim 1, wherein the fan diameter is within the range of 0.3 m to 2.0 m.

8. The turbofan gas turbine engine as claimed in claim 1, wherein the heat exchanger module has a flow area and the fan module has a flow area, and a ratio of the fan module flow area to the heat exchanger module flow area being in the range of 0.3 to 0.8.

9. The turbofan gas turbine engine as claimed in claim 1, wherein the heat exchanger module has a fluid path diameter, wherein the fluid path diameter is greater than the fan diameter.

10. The turbofan gas turbine engine as claimed in claim 1, the turbofan gas turbine engine further comprising an outer housing, the outer housing enclosing the sequential arrangement of heat exchanger module, fan assembly, compressor module, and turbine module, an annular bypass duct being defined between the outer housing and the sequential arrangement of modules, a bypass ratio being defined as a ratio of a mass air flow rate through the bypass duct to a mass air flow rate through the sequential arrangement of modules, and wherein the bypass ratio is less than 2.0.

11. The turbofan gas turbine engine as claimed in claim 1, wherein the fan assembly has two or more fan stages, at least one of the fan stages comprising a plurality of fan blades defining the fan diameter.

12. The turbofan gas turbine engine as claimed in claim 1, wherein, in use, an airflow entering the heat exchanger module with a mean velocity of 0.4M, is divided between the set of vane airflows having a mean velocity of 0.2M, and the set of channel airflows having a mean velocity of 0.6M.

13. A method of operating an aircraft comprising the gas turbine engine as claimed in claim 1, the method comprising taking off from a runway, wherein the maximum rotational speed of the turbine during take-off is in the range of from 8500 rpm to 12500 rpm.

14. A method of operating a turbofan gas turbine engine, the gas turbine engine comprising, in axial flow sequence, a heat exchanger module, an inlet duct, a fan assembly, a compressor module, a turbine module, and an exhaust module, and wherein the method comprises the steps of:
   (i) providing the fan assembly, the compressor module, and the turbine module;
   (ii) positioning the heat exchanger module in fluid communication with the fan assembly by the inlet duct;
   (iii) providing the heat exchanger module with a plurality of radially-extending hollow vanes arranged in a circumferential array, with a channel extending axially through the heat exchanger module between adjacent hollow vanes, such that an airflow entering the heat exchange module is divided between a set of vane airflows through each of the hollow vanes, each vane airflow having a vane mass flow rate, and a set of channel airflows through each of the channels, each channel air flow having a channel mass flow rate;
   (iv) providing each of the hollow vanes with, at least one heat transfer element, and a flow modulator, the flow modulator including a plurality of vanes; and
   (v) operating the gas turbine engine including active control of the flow modulator to regulate a sum of the vane mass flow rates as a proportion of a total air mass flow entering the heat exchanger module in response to a user requirement.

* * * * *